(No Model.)
J. H. BOOTHE.
TUG HOOK.
No. 458,761. Patented Sept. 1, 1891.
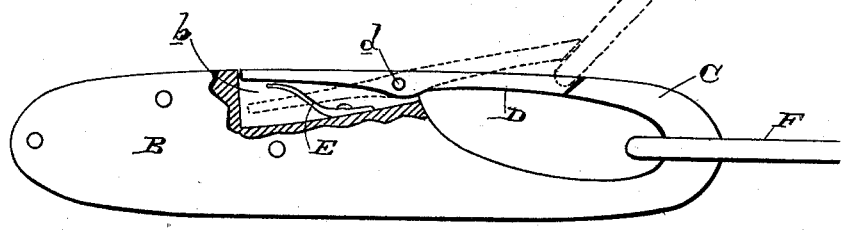
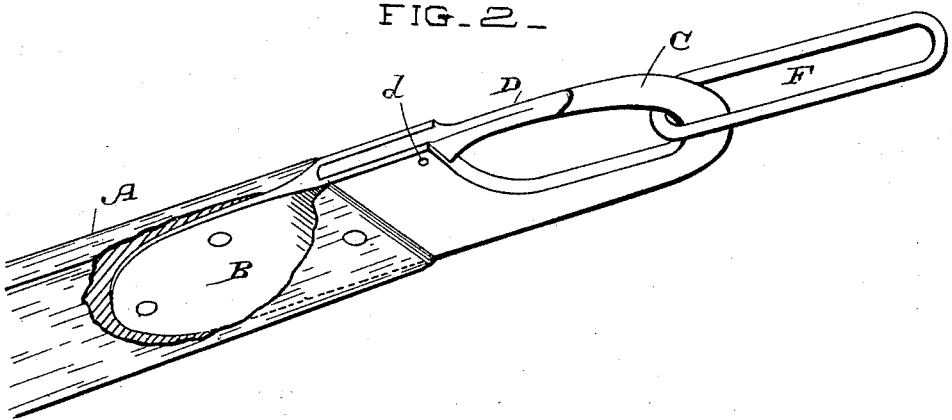
Witnesses:
J. H. Crouse
J. A. Bayless
Inventor,
John H. Boothe
By Dewey & Co.
att'ys

UNITED STATES PATENT OFFICE.

JOHN H. BOOTHE, OF HOLLISTER, CALIFORNIA.

TUG-HOOK.

SPECIFICATION forming part of Letters Patent No. 458,761, dated September 1, 1891.

Application filed April 17, 1891. Serial No. 389,354. (No model.)

*To all whom it may concern:*

Be it known that I, JOHN H. BOOTHE, a citizen of the United States, residing at Hollister, San Benito county, State of California, have invented an Improvement in Tug-Hooks; and I hereby declare the following to be a full, clear, and exact description of the same.

My invention relates to the general class of tug-hooks, and especially to those which are adapted for what is known as "short-tug harness" or "butt-chain harness."

My invention consists in the novel hook hereinafter fully described, and specifically pointed out in the claim.

The object of my invention is to provide a hook which can readily and effectively engage the chain connection with the whiffletree, but which has its point so guarded and protected that it cannot by any accident cut or injure the horses.

Referring to the accompanying drawings for a more complete explanation of my invention, Figure 1 is a side elevation of my hook, the socket *b* being in section, and the dotted lines showing the position of the tongue D when admitting the link F. Fig. 2 is a perspective view of my hook.

A is the end of the tug, to which is properly riveted the plate B, which is formed at one end with the hook C, and has its opposite end or shank flattened. In the upper rear end of this plate is formed a socket or recess *b*, and in this is pivoted at *d* the tongue D. Said tongue extends forwardly into said socket and is flush with the top of the plate, while its rear end extends backwardly to and bears upon the end of the hook C. The bearing is such that in order to open or expose the hook the tongue must rise or move outwardly from the end of the hook. It cannot move downwardly or inwardly as the joint or line of meeting is on a bevel. The tongue is held in this position securely by means of a spring E within the socket or recess *b* and bearing under its forward end.

F is the chain by which the tug is connected with the whiffletree. In order to insert this chain, its link is first put through the hook-opening in the plate, and then one side of it is raised so as to lift the tongue from below, or from the inside, thereby passing the link around the hook. To release it again, the tongue must be raised from below or from within. The advantage of this construction is that the hook is always closed and guarded, and by reason of the position of the tongue opening upwardly or outwardly said tongue is not liable to be opened by any accidental cause, as such causes always press from the outside. If the tongue opened inwardly into the hook, any contact from the outside would push it in, thus exposing the hook end to effect some injury; but by opening outwardly no accidental cause is liable to move it, and consequently the hook is always protected and guarded.

Having thus described my invention, what I claim as new, and desire to secure by Letters Patent, is—

An improved tug-hook consisting of a plate having one end formed with a hook C and having a socket or recess *b* in its upper portion, a tongue pivotally secured near its center to said plate and lying flush with its upper surface, having one end entering the socket, while the opposite end extends to and rests upon the end of the hook, a spring within said socket bearing against the contiguous end of the tongue to normally hold the opposite end closed against the hook, and a flattened shank portion to be inserted in the end of the trace, substantially as herein described.

In witness whereof I have hereunto set my hand.

JOHN H. BOOTHE.

Witnesses:
  A. COWDEN,
  JNO. L. HUDNER.